(12) United States Patent
Yang et al.

(10) Patent No.: US 6,407,511 B1
(45) Date of Patent: Jun. 18, 2002

(54) ELECTRONIC BALLAST SUITABLE FOR LIGHTING CONTROL IN FLUORESCENT LAMP

(76) Inventors: Changgen Yang, Room 404 No. 19 Kailusicum, Shanghai, P.R. (CN), 200438; William Yu, 12310 Herrington Manor Dr., Silver Spring, MD (US) 20904

( * ) Notice: Subject to any disclaimer, the term of this patent is extended or adjusted under 35 U.S.C. 154(b) by 0 days.

(21) Appl. No.: 09/594,125

(22) Filed: Jun. 14, 2000

(30) Foreign Application Priority Data

Oct. 25, 1999 (CN) .......................................... 99119826

(51) Int. Cl.[7] .............................................. H05B 37/02
(52) U.S. Cl. .................... 315/224; 315/247; 315/DIG. 5
(58) Field of Search ................................ 315/247, 224, 315/DIG. 2, DIG. 5

(56) References Cited

U.S. PATENT DOCUMENTS

| | | | |
|---|---|---|---|
| 4,348,615 A | 9/1982 | Garrison et al. | |
| 4,658,343 A | * 4/1987 | Shepard | 363/22 |
| 5,049,790 A | 9/1991 | Herfurth et al. | |
| 5,237,243 A | 8/1993 | Chung | |
| 5,262,699 A | 11/1993 | Sun et al. | |
| 5,334,915 A | 8/1994 | Ohsaki et al. | |
| 5,449,981 A | 9/1995 | Auld, Jr. et al. | |
| 5,493,182 A | 2/1996 | Sowa et al. | |
| 5,539,281 A | 7/1996 | Shackle et al. | |
| 5,598,326 A | 1/1997 | Liu et al. | |
| 5,612,597 A | 3/1997 | Wood | |
| 5,719,473 A | * 2/1998 | Huber et al. | 315/247 |

* cited by examiner

Primary Examiner—David Vu
(74) Attorney, Agent, or Firm—Dowell & Dowell, P.C.

(57) ABSTRACT

An electronic ballast suitable for lighting control for a fluorescent lamp which includes a bridge rectifier for rectifying input commercial power supply voltage and a high frequency oscillator for feeding the fluorescent lamp a high frequency supply voltage, wherein the electronic ballast further comprises a linear active switching mode filter circuit for filtering the output of bridge rectifier by a linear active switching mode and feeding a supply voltage to the high frequency oscillator. With such configuration, the electronic ballast can be combined with a conventional thyristor lighting controller.

9 Claims, 7 Drawing Sheets

ELECTRONIC BALLAST SUITABLE FOR LIGHTING CONTROL IN FLUORESCENT LAMP

BACKGROUND OF THE INVENTION

1. Field of the Invention

The invention relates to an electronic ballast for fluorescent lamp, and more particularly, to an electronic ballast suitable for using a conventional thyristor lighting controller for an incandescent lamp to control the lighting of a fluorescent lamp.

2. Description of Related Art

In most of the lighting-control electronic ballasts for fluorescent lamps used today, a pulse-width modulator IC (e.g. modulator in D2220 lighting-control electronic ballast, Osram, Germany) or a frequency modulator IC (e.g. modulator in MD140 lighting-control electronic ballast, MEDERY, U.S.A.) is used as a control circuit to control the output power of a ballast for the purpose of flux or luminance control in a fluorescent lamp. These solutions are complicated and expensive. In addition, there is a high-power-factor solution implemented by two transistors with a capacitor to isolate DC components of total high frequency output current from a lamp and an additional diode to rectify the total high output current feed back to one DC output terminals of a bridge rectifier through the capacitor, such as M128 lighting-control electronic ballast (made by MITOR in the U.S.A.). However, this solution is low in efficiency and hard to prevent from flashing.

As well known, there are three types of electronic ballast: low-power-factor electronic ballast, current-pursuing type electronic ballast, and constant-voltage type electronic ballast. In a combination of low-power-factor electronic ballast and conventional thyristor lighting controller for incandescent lamp, interrupted power supply for the fluorescent lamp, and thus flashing, will occur, since both the input current waveform of the ballast and the output current waveform of the thyristor controller are discontinuous. In the current-pursuing type electronic ballast, peak ratio of its input current is high (>1.7) and the life-time of a fluorescent lamp will be greatly reduced when it is combined with a thyristor lighting controller. Also, the constant-voltage type electronic ballast can not be combined with a thyristor lighting controller to control the lighting due to its constant voltage supplied to the fluorescent lamp.

SUMMARY OF THE INVENTION

The invention is directed to overcoming the problems set forth above. Therefore, the object of the invention is to provide a simple structure, low cost and high efficiency electronic ballast capable of combining with a conventional thyristor lighting controller for an incandescent lamp to control the lighting of a fluorescent lamp.

Thus, in accordance with the invention, an electronic ballast suitable for the lighting control of a fluorescent lamp comprises a bridge rectifier for rectifying the input commercial power supply voltage and a high frequency oscillator to provide the loading fluorescent lamp a high frequency supply voltage.

The electronic ballast further comprises a linear active switching mode filter circuit for filtering the output voltage of the rectifier by a linear active switching mode and feeding a supply voltage to the high frequency oscillator.

The above-mentioned electronic ballast for fluorescent lamp according to the invention has the advantage of simple structure, low cost and high efficiency in the case of stand-alone applications. Furthermore, it can be combined with a conventional thyristor lighting controller for incandescent lamp to form a lighting-control electronic ballast for fluorescent lamp having the advantages of easy prevention of flashing, high input power factor and low lamp current peak ratio.

BRIEF DESCRIPTION OF DRAWINGS

For a more complete understanding of the present invention and for further features and advantages, description is made below in conjunction with the accompanying drawings, wherein:

FIGS. 5(a), 5(b) and 5(c) are the input voltage/current and lamp current/voltage waveform diagrams of the embodiments without a thyristor lighting controller, in which FIG. 5(a) is an input voltage/current waveform diagram of the fluorescent lamp ballast in the embodiment and FIG. 5(b) is a lamp voltage waveform diagram, and FIG. 5(c) is a lamp current waveform diagram of the fluorescent lamp;

FIGS. 6(a), 6(b) and 6(c) are input voltage/current and lamp current/voltage waveform diagrams of the embodiments having a thyristor lighting controller with 100% lighting control power, in which FIG. 6(a) is an input voltage/current waveform diagram of the fluorescent lamp ballast in the embodiment, and FIG. 6(b) is a lamp voltage waveform diagram and FIG. 6(c) is a lamp current waveform diagram of the fluorescent lamp;

FIGS. 7(a), 7(b) and 7(c) are the input voltage/current and lamp current/voltage waveform diagrams of the embodiments having a thyristor lighting controller with 60% lighting control power, in which FIG. 7(a) is an input voltage/current waveform diagram of the flourescent lamp ballast in the embodiment and FIG. 7(b) is a lamp voltage waveform diagram, and FIG. 7(c) is a lamp current waveform diagram, of the fluorescent lamp; and FIGS. 8(a), 8(b) and 8(c) are the input voltage/current and lamp current/voltage waveform diagrams of the embodiments having a thyristor lighting controller with 30% lighting control power, in which FIG. 8(a) is an input voltage/current waveform diagram of the fluorescent lamp ballast in the embodiment, and FIG. 8(b) is a lamp voltage waveform diagram and FIG. 8(c) is a lamp current waveform diagram, of the fluorescent lamp.

DETAILED DESCRIPTION OF PREFERRED EMBODIMENTS

Figure 1:
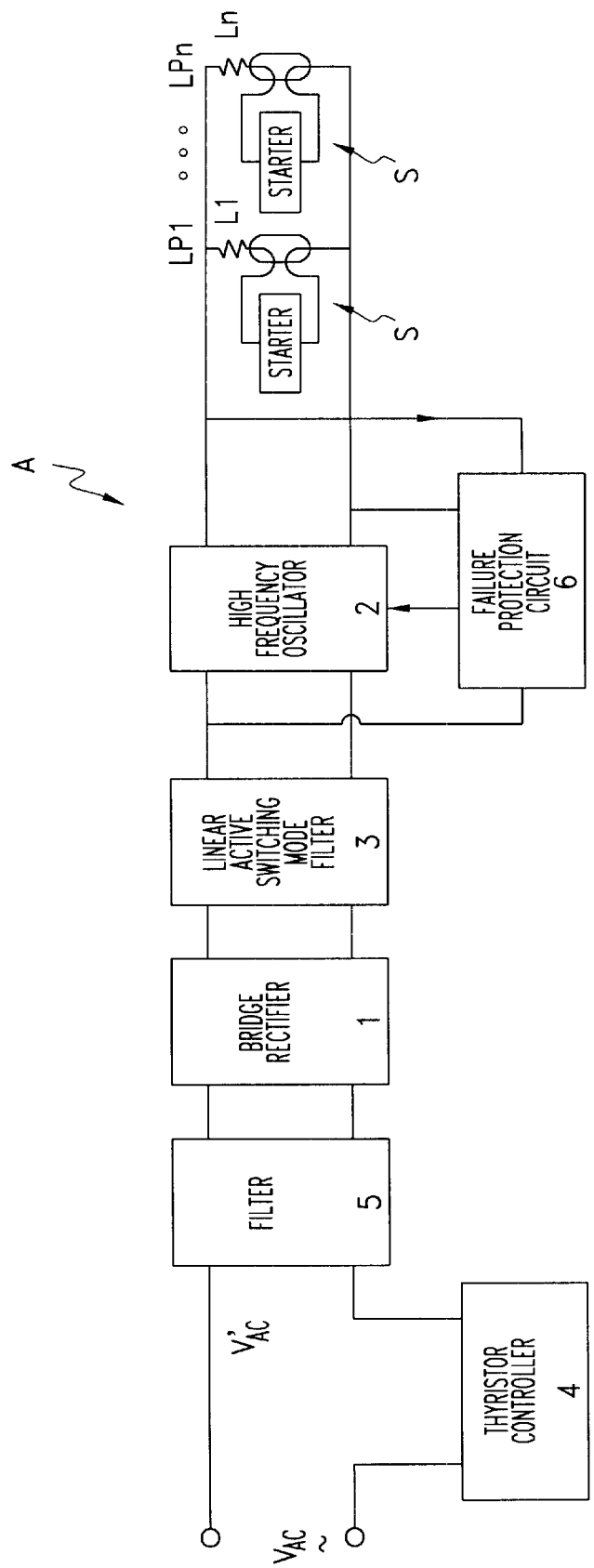
FIG. 1 is a block diagram showing the configuration of an electronic ballast for fluorescent lamp in an embodiment according to the invention.

Now, referring to FIG. 1, there is a block diagram showing the configuration of an electronic ballast for a fluorescent lamp in an embodiment according to the invention. The electronic ballast "A" comprises a bridge rectifier 1 for rectifying the commercial power supply voltage (i.e. $V_{AC}$ when the thyristor lighting controller 4 is not included), and a high frequency oscillator 2 capable of feeding a high frequency supply voltage to the loading fluorescent lamps LP–LPn, wherein the electronic ballast further comprises a linear active switching mode filter circuit 3 for filtering the output voltage from bridge rectifier 1 by a linear active switching mode filter and feeding a supply voltage to the high frequency oscillator 2. The loading fluorescent lamps LP1–LPn form fluorescent lamp branches (n>0, integer) connected to the output terminals of high frequency oscillator 2 in parallel, and each branch consists of a fluorescent lamp with a ballast inductor L1–Ln connected serially to one of its filaments and a starting circuit "S" connected between its two filaments.

Figure 2:
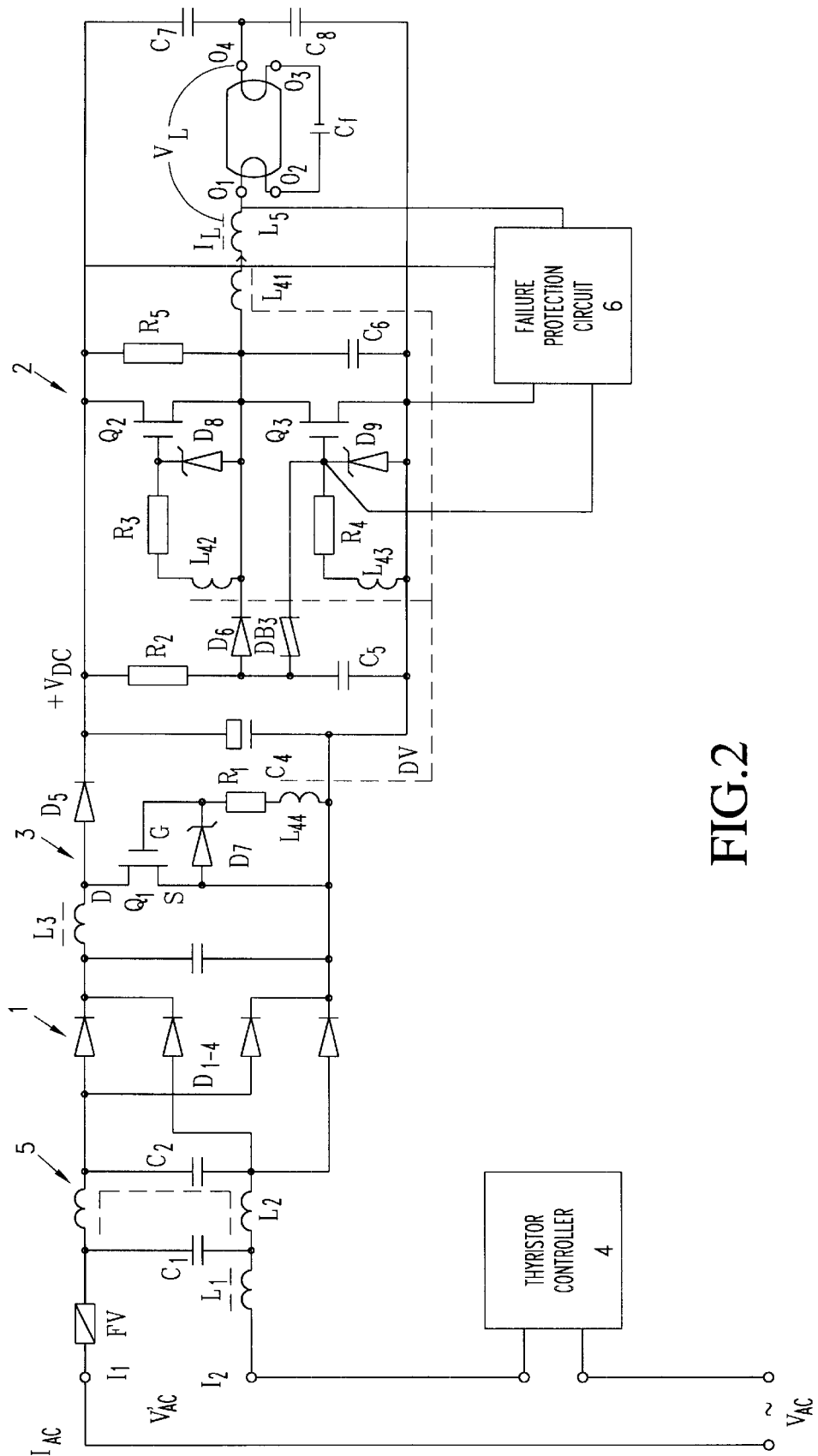
FIG. 2 is a circuit diagram showing particularly a configuration of the embodiment of FIG. 1.

As shown in FIG. 2 a thyristor lighting controller 4 for a conventional incandescent lamp is connected in series to one of the commercial power input branches of the electronic ballast "A" according to the invention when the electronic ballast "A" is required to form an adjustable lighting ballast.

If the electronic ballast "A" is required to be shielded from interference caused by commercial power, a filter 5 is cascaded before the bridge rectifier 1, as shown on FIG. 1.

In addition, there may be a protection circuit 6 in the output of high frequency oscillator 2 to control the oscillator 2 so that the electronic ballast can be safe from abnormal low impedance conditions such as failure to start a fluorescent lamp, rectification effect, and short-circuit of a starting circuit.

The above-mentioned thyristor controller 4, filter 5, and failure protection circuit 6 are known in the prior art, and their details are omitted.

Referring to FIG. 2, a circuit diagram of the embodiment illustrated as a block diagram in FIG. 1 is shown, but the circuit configuration of thyristor lighting controller 4 is omitted since it is well-known in the art. In FIG. 2, the filter 5 consists of capacitors $C_1$, $C_2$, and a neutral inductor $L_2$; the bridge rectifier 1 consists of diodes $D_1$–$D_4$; the high frequency oscillator 2 consists of field effect transistors (FETs) $Q_2$, $Q_3$ (or replaced by bipolar transistors), diodes $D_6$, $D_8$ and $D_9$, trigger diode $DH_3$, inductor $L_5$, and inductance coils $L_{41}$–$L_{43}$ with a common core. The filter 5, bridge rectifier 1, and high frequency oscillator 2 described above are known in prior art, and their repeated descriptions are omitted.

The key to the invention lies in a linear active switching mode filter 3 connected between the high frequency oscillator 2 and the bridge rectifier 1. In this exemplary embodiment, the filter 3 consists of a field effect transistor (FET) $Q_1$ (or replaced by a bipolar transistor), diodes $D_5$, $D_7$, capacitors $C_3$, $C_4$, inductors $L_3$, $L_{44}$, and a resistor $R_1$. The FET $Q_1$ is operable as a switch to transform the output DC voltage from bridge rectifier 1 into a high frequency pulse voltage. Then, the pulse voltage is rectified by diode $D_5$ and capacitor $C_4$ connected in series between the source and drain of FET $Q_1$ to output a DC supply voltage $V_{DC}$ for high frequency oscillator 2 from the node of capacitor $C_4$ and diode $D_5$. The capacitor $C_3$ is operable to bypass the high frequency components of output voltage from bridge rectifier 1. The inductance coil $L_{44}$ uses the same common core in inductance coils $L_{41}$–$L_{43}$; thereby the high frequency voltage from high frequency oscillator 2 is coupled to the gate of FET $Q_1$ and applied as a high frequency switching signal for controlling FET $Q_1$ to generate the high frequency pulse voltage. The inductor $L_3$ functions to charge, boost, and filter the high frequency pulse voltage so that the DC voltage $V_{DC}$ is larger than that output from bridge rectifier 1. For overvoltage protection, a voltage regulating diode $D_7$ is connected between the gate and source of FET $Q_1$ with a current limiting resistor $R_1$. The inductor $L_{44}$ for coupling a switching signal from high frequency oscillator 2 is not essential to the switching mode filter 3, because the switching signal can be generated by the switching mode filter 3 itself with a changed configuration. Also, the diode $D_7$ and resistor $R_1$ are used to enhance reliability, and are not essential.

Next, the operation of the embodiment stated above will be described. Referring to FIG. 2 again, when the commercial power supply voltage, i.e. the input supply voltage $V_{AC}$ is inputed through $I_1$, $I_2$, the $Q_1$ is not operated immediately at the beginning, but the high frequency oscillator 2, comprised of $Q_2$, $Q_3$, etc, is initiated, and an approximate-square-wave high frequency current occurs in the transformer $L_4$, comprised of inductance coil $L_{41}$–$L_{44}$ with a common core, whereby a high frequency switching voltage is induced on the coil $L_{44}$ to force the $Q_1$ running into its active switching state. Thus, Pf≈1, where Pf is the input power factor between terminals $I_1$ and $I_2$, and the waveform of input current $I_{AC}$ of electronic ballast "A" will be an approximate sine wave when the input voltage $V_{AC}$ is a sine wave (corresponding to the non-lighting-control state or 100% lighting control state). If the input voltage $V_{AC}$ is an irregular wave, such as a vertically interrupted sine wave formed by thyristor lighting controller, corresponding to the lighting control state of thyristor lighting controller 4, the input current $I_{AC}$ will be a same vertically interrupted sine wave as that of input voltage $V_{AC}$ due to the pure-resistance input characteristic resulted from constant Pf≈1 between terminals $I_1$ and $I_2$. Namely, a well linear load feature like that of a incandescent lamp is obtained. Typically, an input power factor Pf>0.99 (0.991–0.998) can be given in an electronic ballast according to the invention.

The high frequency oscillator 2, comprised of $Q_1$, $Q_2$, etc, is designed to allow a wide operating range of DC voltage $V_{AC}$ ($V_{DCmax}$:$V_{DCmin}$5:1), and therefore the change ratio of flux or luminance of fluorescent lamp, i.e. the change ratio of the output power from oscillator 2 to the magnitude of $V_{DC}$, can be greater than 5:1.

Although the input voltage of electronic ballast "A" will be discontinuous with transient interruption, its effective value varies when the thyristor lighting controller 4 is operated in different angles. In the switching mode filter 3, the DC voltage $V_{DC}$ outputed for capacitor $C_4$ is always relatively stable, resulting in a lamp current peak ratio CFi<7, due to the larger capacitance of $C_4$; thus the switching voltage fed to the gate of switching transistor $Q_1$ from high frequency oscillator 2 is stable (with a frequency range 20–60 kc) without the variation resulted from discontinuous or irregular input voltage $V_{AC}$, and the effective components of $V_{AC}$ are being chopped continuously for feeding a supply voltage continuously to the high frequency oscillator 2 from energy stored in $C_4$ through charging and discharging of $L_3$ and rectifying and isolating of $D_5$. Then, the $V_{DC}$ is larger or smaller when the $V'_{AC}$ is larger or smaller, but the DC voltage $V_{DC}$ is always characterized by a relative stability. Accordingly, the discontinuity of input current $I'_{AC}$ caused by thyristor chopping can not effect the interruption of fluorescent lamp supply current waveform, and the lamp is always in a relatively stable and rational status (lamp current peak ratio Cfi<1.7) without flashing. Moreover, it overcomes the disadvantages of unacceptable combination of conventional fluorescent lamp ballast and thyristor lighting controller.

Figure 3:
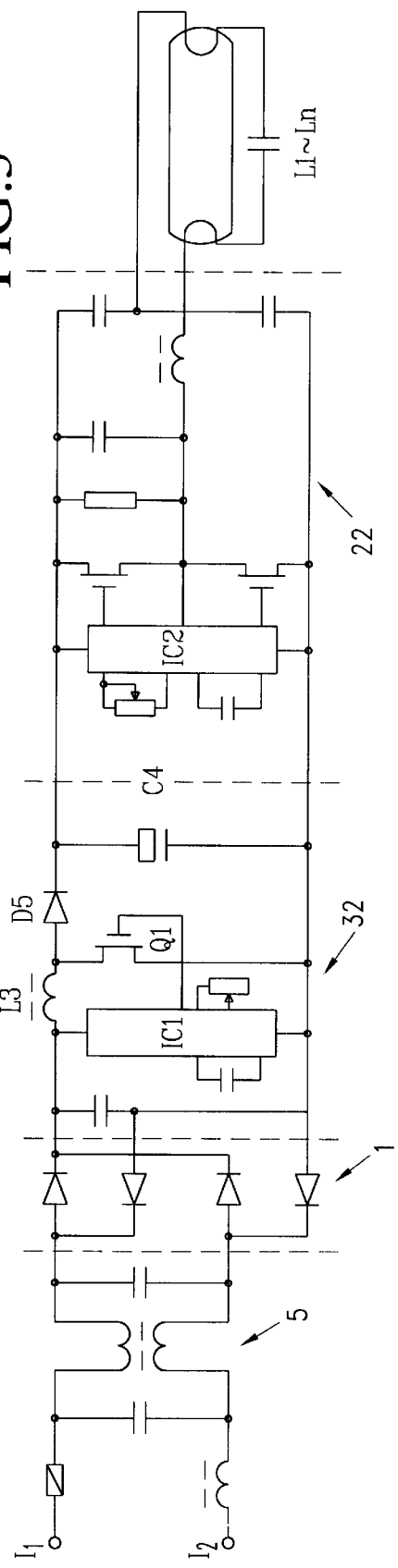
FIG. 3 is a circuit diagram showing another configuration of the invention.

Another circuit configuration of an electronic ballast according to the invention is shown particularly in FIG. 3, wherein the filter 5 and bridge rectifier 1 are similar to those in FIG. 2, and their details are omitted. Unlike the switching mode filter in FIG. 2, the linear active switching mode filter circuit 32 generates a frequency modulated switching signal for FET $Q_1$ from an oscillator integrated circuit $IC_1$ itself, and the inductor $L_3$, diode $D_5$, and capacitor $C_4$ perform the same functions as those in FIG. 2, respectively. The high frequency oscillator 22 consists of an integrated circuit $IC_2$ including a driver, a coupling circuit, and FETs $Q_2$, $Q_3$.

Figure 4:
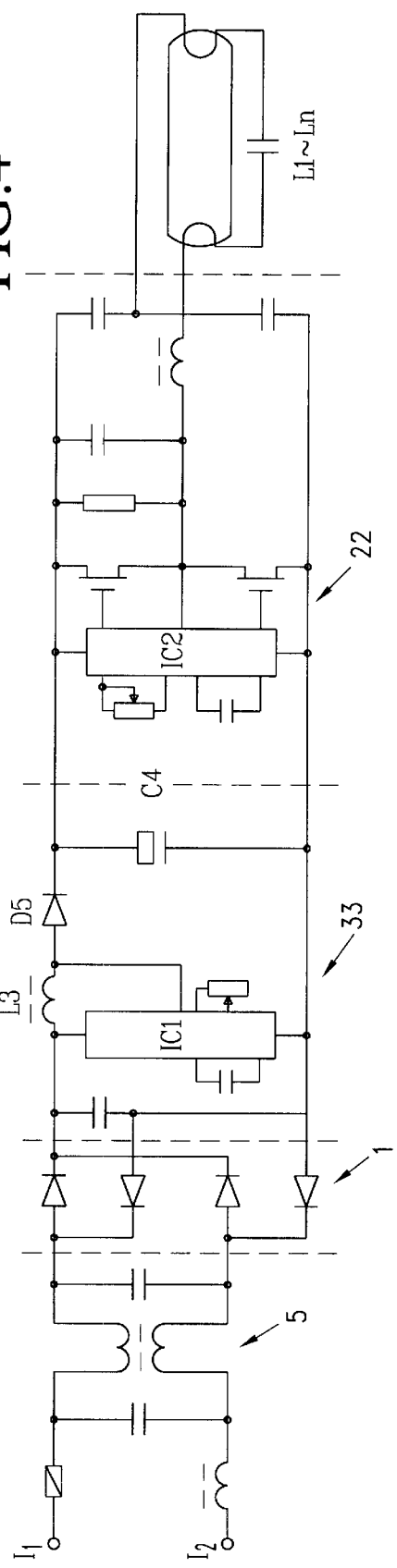
FIG. 4 is a circuit diagram showing a further configuration of the invention.

Still another circuit configuration of an electronic ballast according to the invention is shown in FIG. 4, wherein the filter 5, bridge rectifier 1, and high frequency oscillator 22 are similar to those in FIG. 3, and their details are omitted. Unlike the switching mode filter circuit in FIG. 3, the linear active switching mode filter circuit 33 comprises an integrated circuit $IC_3$ to form an oscillator for generating frequency modulated switching signal and the FET $Q_1$ as a high frequency switch itself. The inductor $L_3$, diode $D_5$, and capacitor $C_4$ perform the same functions as those in FIG. 2, respectively.

As can be seen from the above description, various changes can be made for the implementation of linear active switching mode filter circuit 3. The key to the invention lies in the connection of a linear active switching mode filter circuit 3 between the bridge rectifier 1 and the high frequency oscillator 2, thus the invention should not be limited by the particular circuits described above.

Referring to FIGS. 5–8, the results obtained by an electronic ballast according to the invention will be given below.

Figure 5A:
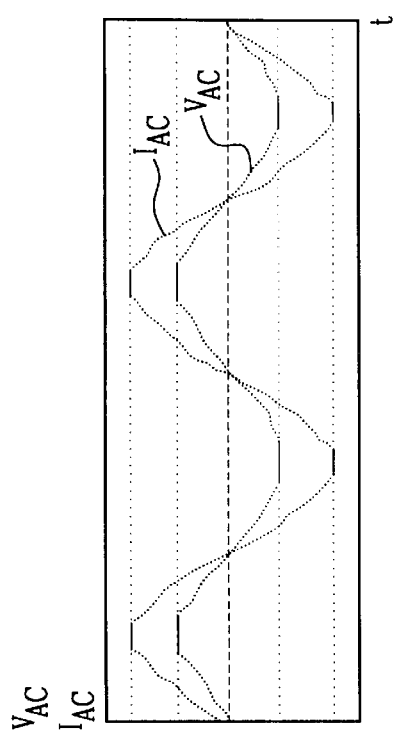
Figure 5C:
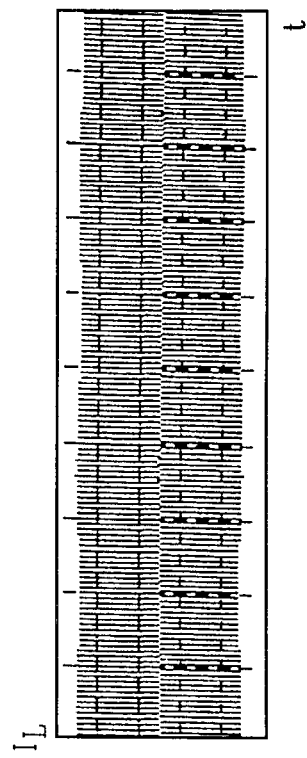
Figure 5B:

FIG. 5 shows the input voltage/current and lamp current/voltage waveforms when a thyristor lighting is not connected, in which FIG. 5(a) is the waveforms of input voltage $V_{AC}$ and input current $I_{AC}$ of fluorescent lamp ballast in the embodiment, and FIG. 5(b) and FIG. 5(c) are lamp voltage ($V_L$) waveform and lamp current($I_L$) waveform for the fluorescent lamp, respectively. From FIG. 5(a), it is apparent that there is substantially no phase difference between $V_{AC}$ and $I_{AC}$ showing an equivalent "pure resistance" characteristic of the input impedance on terminals $I_1$, $I_2$ of electronic ballast, and an input efficiency up to 0.998 can be obtained. As can be seen from FIG. 5(c), the amplitudes of lamp voltage $V_L$ and lamp current $I_L$ are so flat as to provide an output current (i.e. lamp current) peak ratio below 1.38.

Figure 6C:
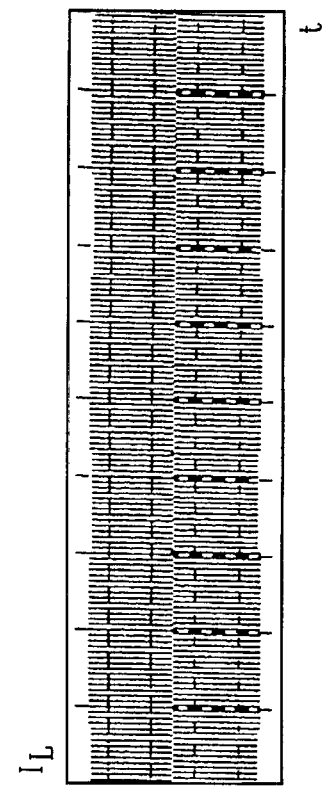
Figure 6A:
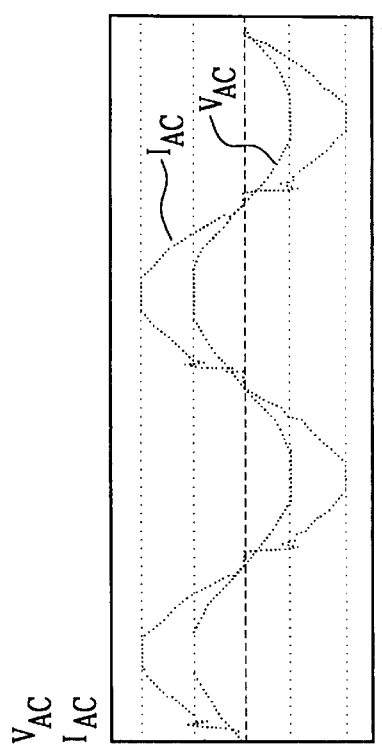
Figure 6B:
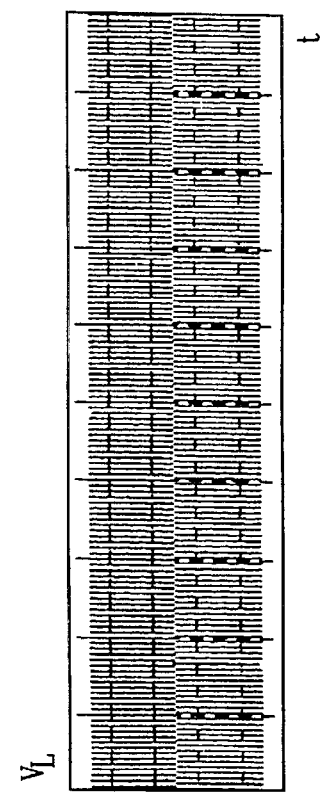

FIG. 6 shows the input voltage/current and lamp current/voltage waveform when a thyristor lightning controller is connected with 100% lighting control power, in which FIG. 6(a) is the waveform of input voltage $V_{AC}$ and input current $I_{AC}$ of fluorescent lamp ballast in the embodiment, and FIG. 6(b) and FIG. 6(c) are lamp voltage ($V_L$) waveform and lamp current ($I_L$) waveform for the fluorescent lamp, respectively. From FIG. 6(a), it is apparent that there is substantially no phase difference between $V_{AC}$ and $I_{AC}$, showing an equivalent "pure resistance" characteristic of the input impedance on terminals $I_1$, $I_2$ of electronic ballast, and an input efficiency Pf up to 0.995 can be obtained. As can be seen from FIG. 6(b) and FIG. 6(c), the amplitudes of lamp voltage $V_L$ and lamp current $I_L$ are so flat to provide an output current (i.e. lamp current) peak ratio below 1.39.

Figure 7A:
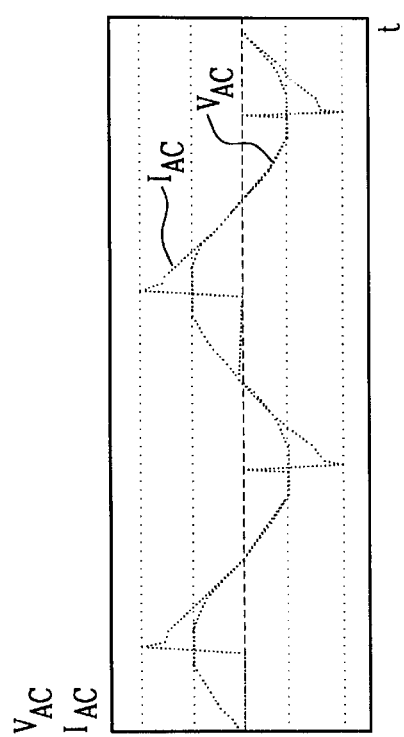
Figure 7B:
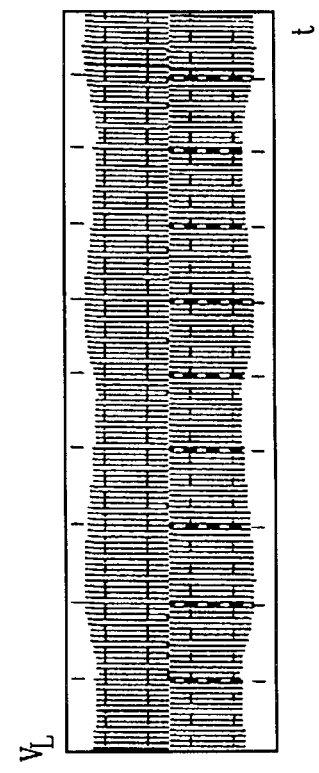
Figure 7C:
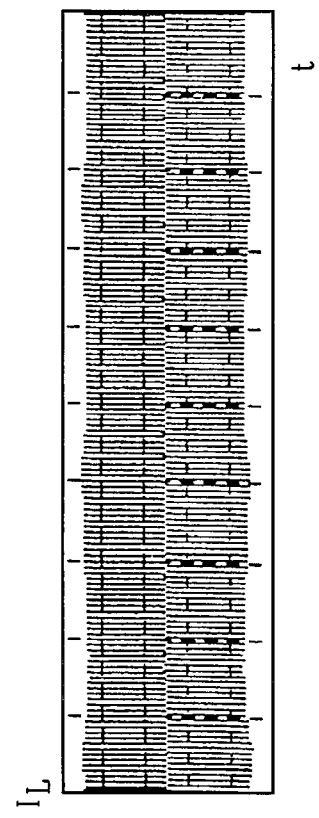
Figure 8C:
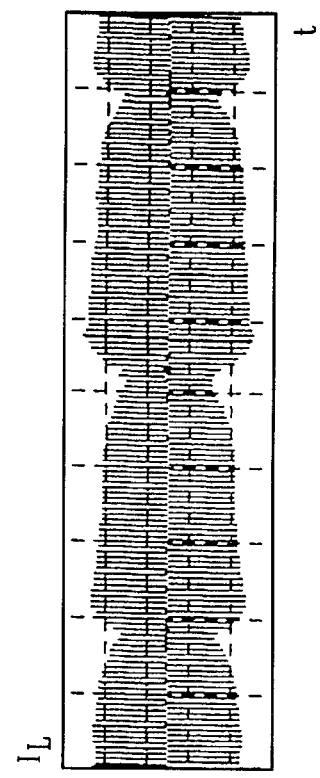
Figure 8A:
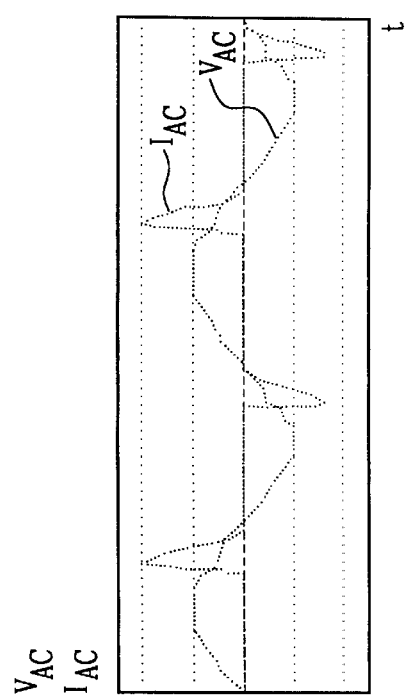
Figure 8B:
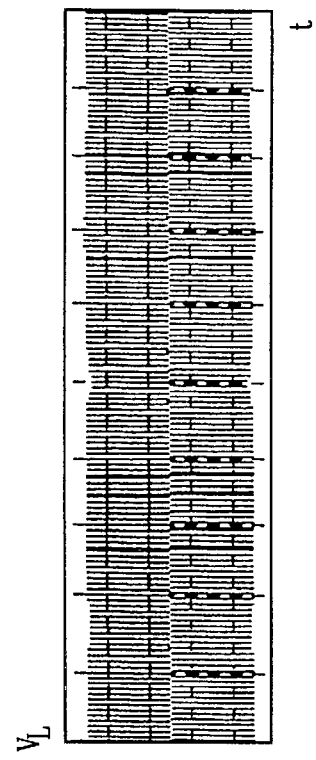

FIG. 7 shows the input voltage/current and lamp current/voltage waveforms when a thyristor lighting controller is connected with 60% lighting control power, in which FIG. 7(a) is the waveforms of input voltage $V_{AC}$ and input current $I_{AC}$ of fluorescent lamp ballast in the embodiment, and FIG. 7(b) and FIG. 7(c) are lamp voltage ($V_L$) waveform and lamp current ($I_L$) waveform for the fluorescent lamp respectively. As can be seen from FIG. 7(a), the input current $I_{AC}$ becomes a series of approximate triangle pulses resulted from the discontinuous gating of thyristor lighting controller 4 in same pulse-type manner, and the input efficiency Pf is decreased to 0.704 because of the difference between input current waveform and input voltage waveform, but the input impedance still retains the "pure resistance" characteristic. Furthermore, FIG. 7(b) shows the relatively flat $V_L$ voltage waveform, however, FIG. 7(c) indicates a variation envelope of $I_L$ with an output current peak ratio below 1.44, FIG. 8 shows the input voltage/current and lamp current/voltage waveforms when a thyristor lighting controller is connected with 30% lighting control power, in which FIG. 8(a) is the waveforms input voltage $V_{AC}$ and input current $I_{AC}$ of fluorescent lamp ballast in the embodiment, and FIG. 8(b) and FIG. 8(c) are lamp voltage ($V_L$) waveform and lamp current ($I_L$) waveform for the fluorescent lamp respectively. As can be seen from FIG. 8(a), a small phase shift between $V_{AC}$ and $I_{AC}$ occurs, and brings negative effect on the "pure resistance" characteristic, while the input efficiency Pf is decreased to 0.258 as a result of the waveform difference and phase shift between $V_{AC}$ and $I_{AC}$. Moreover, a slight variation envelope and $V_L$ and a considerable variation envelope of $I_{AC}$ are shown in FIG. 8(b) and FIG. 8(c) respectively, but the output current peak ratio maintains a value below 1.55.

According to the results obtained by the invention described above, it is obviously that the output current and voltage waveform of electronic ballast in accordance with the invention are always continues regardless of the uses or non-use of lighting control. Therefore the fluorescent lamp can be prevented from flashing when a thyristor lighting controller is incorporated for lighting control. Furthermore, the input efficiency is very high in case of no thyristor lighting controller in use or 100% lighting control, and an output peak ratio below 1.7 can be maintained even in case of 30% lighting control power. Thus, the electronic ballast according to the invention can be combined with a thyristor lighting controller and obtain the same results of lighting control as those in a conventional incandescent lamp. In addition, as can be known from the embodiment described above in detail, the electronic ballast according to the invention is simpler in its configuration, and is of benefit in low cost and high reliability.

Although various embodiments of the invention have been disclosed and described hereinbefore, the invention is nonetheless limited only by the following claims.

We claim:

1. An electronic ballast suitable for lighting control for a fluorescent lamp, comprising; a bridge rectifier for rectifying an input power supply voltage and a high frequency oscillator to feed a fluorescent lamp a high frequency supply voltage, said electronic ballast further including a linear active switching mode filter circuit, for filtering an output voltage of said bridge rectifier, said linear active switching mode filter circuit including switch means for suppling pulses of high frequency voltage to said high frequency oscillator to said fluorescent lamp, said high frequency oscillator including a transformer including at least four windings ($L_{41}$ $L_{42}$ $L_{43}$ $L_{44}$) whereby a high frequency voltage is induced from said transformer to provide a signal to force said switch means into an active switch state to transmit output voltage from said bridge rectifier into high frequency pulsed voltage to said high frequency oscillator for powering said fluorescent lamp.

2. The electronic ballast as set forth in claim 1, wherein said switch means of said linear active switching mode filter circuit consists of a field effect transistor, an inductance coil connected serially in a gate branch of said field effect transistor for coupling and applying to said switching mode filter circuit said signal, an inductor connected between a drain of said field effect transistor and one output terminal of said bridge rectifier for charging and boosting, and a rectifier circuit connected between a source and said drain of said field effect transistor for feeding said output voltage to said high frequency oscillator.

3. The electronic ballast as set forth in claim 2 wherein said fluorescent lamp forms at least one fluorescent lamp branch in parallel to an output terminal of said high frequency oscillator, and said at least one fluorescent lamp branch consist of at least one fluorescent lamp with a ballast inductor connected serially to one of its filaments and a starting circuit connected between its filaments.

4. The electronic ballast as set forth in claim 2, where said ballast further includes a filter connected between the input power supply voltage and said bridge rectifier for filtering and isolating.

5. The electronic ballast as set forth in claim 4, wherein said ballast further includes a failure protection circuit to protect abnormalities of said fluorescent lamp by the output of said high frequency oscillator.

6. The electronic ballast as set forth in claim 1, wherein a thyristor lighting controller for said fluorescent lamp is connected between an input terminal of said fluorescent lamp and the input power supply voltage.

7. The electronic ballast as set forth in claim 1 wherein said fluorescent lamp forms at least one fluorescent lamp branch of a plurality of fluorescent lamp branches connected in parallel to an output terminal of said high frequency oscillator, and each of said plurality of fluorescent lamp branches consist of a fluorescent lamp with a ballast inductor connected serially to one of its filaments and a starting circuit connected between its filaments.

8. The electronic ballast as set forth in claim 1, where said ballast further includes a filter connected between the input power supply voltage and said bridge rectifier for filtering and isolating.

9. An electronic ballast and lighting controller suitable for lighting control for a fluorescent lamp, comprising; a ballast including a bridge rectifier for rectifying an input power supply voltage and a high frequency oscillator to feed a fluorescent lamp a high frequency supply voltage, said electronic ballast further including a linear active switching mode filter circuit, for filtering an output voltage of said bridge rectifier, said linear active switching mode filter including a switch for pulsing high frequency voltage to said high frequency oscillator in response to said switch receiving activation signals from a transformer of said high frequency oscillator, and a lighting controller including a thyristor lighting controller for said fluorescent lamp connected serially with the input power supply voltage and said ballast.

\* \* \* \* \*